United States Patent [19]
Groteke et al.

[11] Patent Number: 4,564,175
[45] Date of Patent: * Jan. 14, 1986

[54] MOLTEN METAL TRANSFER CRUCIBLE WITH EXTERNAL FILTER

[75] Inventors: Daniel E. Groteke, Cincinnati, Ohio; Avery L. Kearney, Valparaiso, Ind.

[73] Assignee: Metcast Associates, Inc., Cincinnati, Ohio

[ * ] Notice: The portion of the term of this patent subsequent to Apr. 24, 2001 has been disclaimed.

[21] Appl. No.: 602,508

[22] Filed: Apr. 20, 1984

Related U.S. Application Data

[63] Continuation-in-part of Ser. No. 398,406, Jul. 14, 1982, Pat. No. 4,444,377.

[51] Int. Cl.$^4$ ................................................ C21C 7/04
[52] U.S. Cl. ..................... 266/227; 266/275; 222/603; 222/629; 222/591
[58] Field of Search ............. 266/227, 229, 275; 222/591, 603, 604, 605, 629

[56] References Cited

U.S. PATENT DOCUMENTS

| | | | |
|---|---|---|---|
| 3,907,962 | 9/1975 | Ogiso | 266/227 |
| 4,113,241 | 9/1978 | Dore | 266/227 |
| 4,394,271 | 7/1983 | Groteke | 266/227 |
| 4,444,377 | 4/1984 | Groteke et al. | 266/227 |

Primary Examiner—L. Dewayne Rutledge
Assistant Examiner—Robert L. McDowell
Attorney, Agent, or Firm—Janine J. Weins; Michael J. Weins

[57] ABSTRACT

The molten metal transfer crucible of the present invention filters molten metal during transfer of the molten metal to a receptacle such as a mold. The molten metal transfer crucible of the present invention is fitted with an external removable filter blade. The removable filter blade contains a filter element and is positioned with respect to an inlet in the transfer crucible such that molten metal is filtered by passing through the filter element contained in the blade while the crucible is being filled with molten metal. During operation molten metal can be intermittently back-flushed through the filter element contained in the blade. Back-flushing molten metal through the filter element extends the life of the filter element, and thereby increases the hours the transfer crucible may be operated between blade changes.

9 Claims, 5 Drawing Figures

MOLTEN METAL TRANSFER CRUCIBLE WITH EXTERNAL FILTER

DESCRIPTION

This application is a continuation-in-part of U.S. Application Ser. No. 398,406 filed July 14, 1982 which has issued as U.S. Pat. No. 4,444,377.

FIELD OF INVENTION

The present invention relates to an apparatus which filters and transfers molten metal, and to the method for using the apparatus.

BACKGROUND ART

During automatic casting operations a crucible is frequently used to transport molten metal from a holding or refining furnace to the molds. Although an effort may be made to melt and transport molten metal that contains a minimum of impurities, the molten metal transported by a crucible to a mold will usually contain impurities which are detrimental to the resulting cast product. These impurities may include oxides of the metal, inclusions introduced by fluxes used during melting, or products formed by interaction of the molten metal with the furnace lining.

Techniques for removing impurities from the molten metal include filtering the molten metal in the holding or melting furnace, and/or placing a gate filter in the mold to filter the molten metal as it enters the mold. If the molten metal is filtered in the holding or melting furnace impurities may be picked up by the molten metal during transfer from the furnace to the crucible, and from the crucible to the mold. If a filter is placed in a mold gate excess superheat may be required, the time to fill the mold may be excessive, and in addition mold gate filtering is costly. Excess superheat can increase gas solubility in the molten metal and will increase the energy costs for the melting and casting operation.

SUMMARY OF INVENTION

The present invention provides an improved transfer crucible for transferring and filtering molten metal. Using the transfer crucible of the present invention molten metal can be filtered while being transferred from a holding or refining furnace to a mold or other appropriate receptacle.

The transfer crucible of the present invention has an inlet and is fitted with an external removable filter blade. The removable filter blade contains a filter element and is positioned with respect to the inlet such that molten metal is filtered by passing through the filter element contained in the blade while the crucible is being fitted with molten metal. When the crucible of the present invention is used in production molten metal is intermittently back-flushed through the filter element contained in the blade. Back-flushing molten metal through the filter element extends the life of the filter element, and thereby increases the hours the transfer crucible may be used between blade changes.

BEST MODES FOR CARRYING THE INVENTION INTO PRACTICE

Figure 1:
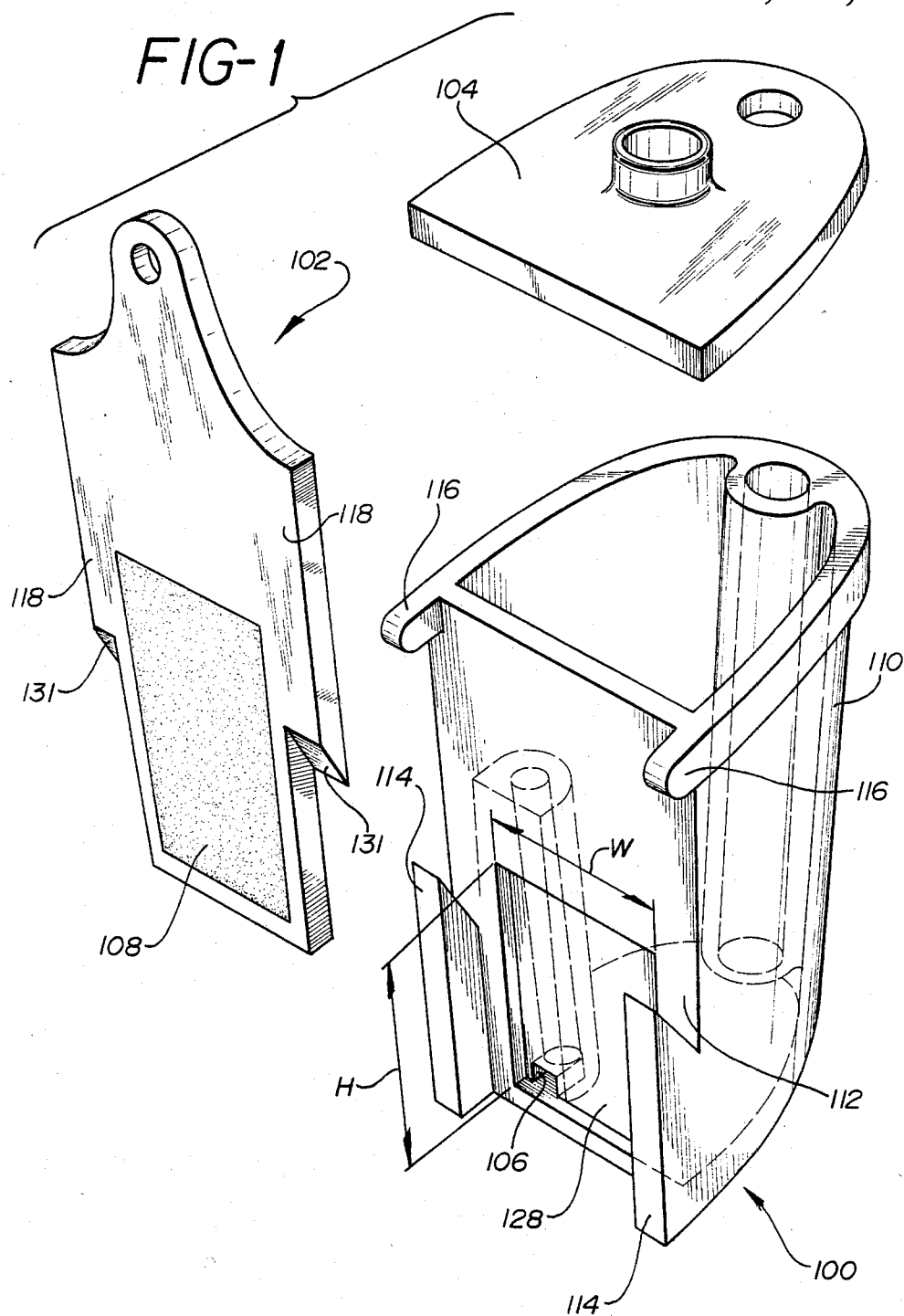
FIG. 1 is a schematic representation of an exploded view of a molten metal transfer crucible of the present invention.

FIG. 1 is a schematic representation of an exploded view of one embodiment of the molten metal transfer crucible of the present invention. FIG. 1 shows a molten metal transfer crucible 100, a removable filter blade 102, and a crucible cover 104. The crucible 100 is provided with an inlet passage 106. The removable blade 102 is positioned with respect to the inlet passage 106 such that molten metal entering the crucible 100 passes through a filter element 108 contained in the blade 102.

To aid in positioning and affixing the blade 102 the wall 110 of the crucible 100 is provided with a ledge 112. Extending from the ledge 112 are lug acceptors 114. The lug acceptors 114 extend from a point on the ledge 112 which is positioned near the center of the filter element 108. Optionally blade guides 116 can be provided. If the blade 102 requires frequent changes one may wish to eliminate the blade guides 116 and thereby reduce the constraints placed on the blade 102 during blade changes. The blade 102 is provided with lugs 118, and the lug acceptors 114 are so contoured as to direct the blade into contact with the ledge 112 when the blade 102 is positioned.

Figure 2:
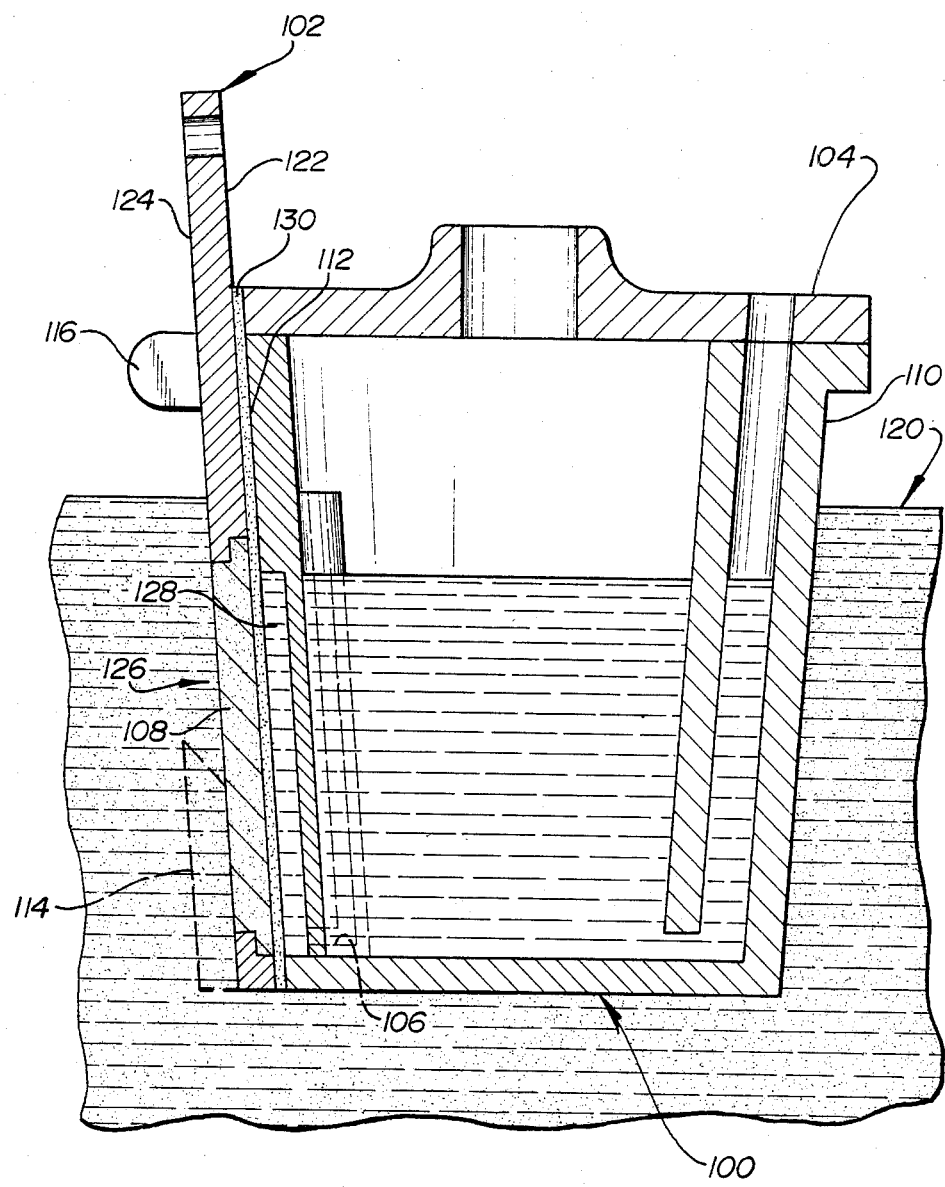
FIG. 2 is a schematic representation of a vertical cross section of the assembled crucible of FIG. 1.

FIG. 2 is a sectional view of the assembled crucible of FIG. 1. The crucible 100 is positioned in a molten metal bath 120. The removable blade 102 has a first surface 122, a second surface 124, and a passage 126 passing through the blade 102 from the first surface 122 to the second surface 124. The filter element 108 is positioned in the passage 126.

Preferably an exterior molten metal chamber 128 is formed in the ledge 112. The molten metal chamber 128 is adjacent to the filter element 108 and contiguous to the inlet passage 106. Preferably the exterior molten metal chamber 128 has a cross sectional area A as defined by the product of the height H and the width W which is at least 5 times the cross sectional area of the opening of the inlet passage 106. This preferred ratio of cross sectional areas assures that the area of the filter element 108 will not limit the fill rate of the crucible 100. It is further preferred that exterior chamber 128 have a cross sectional area which is smaller than the surface area of the filter element 108. If the surface area of the filter element 108 is larger than the cross sectional area A of the exterior chamber 128 support for the filter element 108 is provided by the ledge 112.

If desired a seal 130 can be provided to the ledge 112 or to the blade 102 to assure that molten metal entering the chamber 128 from the molten metal bath 120 must pass through the filter element 108 and that the blade 102 can be readily removed without damage to the crucible 100. In addition a separable seal should be provided to the sloped surfaces 131 which forms a first region of increasing thickness of the lugs 118 which mate with the lug acceptors 114 as shown in FIG. 1 to assure that the removable blade can readily be removed and replaced. Seals such as a seal comprised of three layers, the first layer being a graphite mat impregnated with a polymer, the second layer being a cloth woven of graphite fibers, and the third layer being similar to the first layer, a graphite mat impregnated with a polymer; a seal made from a refractory felt such as FIBERFRAX a trademark of Carborunoum Company of Niagara Falls, N.Y.; or a gasket seal in combination with ribs on the mating surface of the paddle can be utilized.

Figure 3:
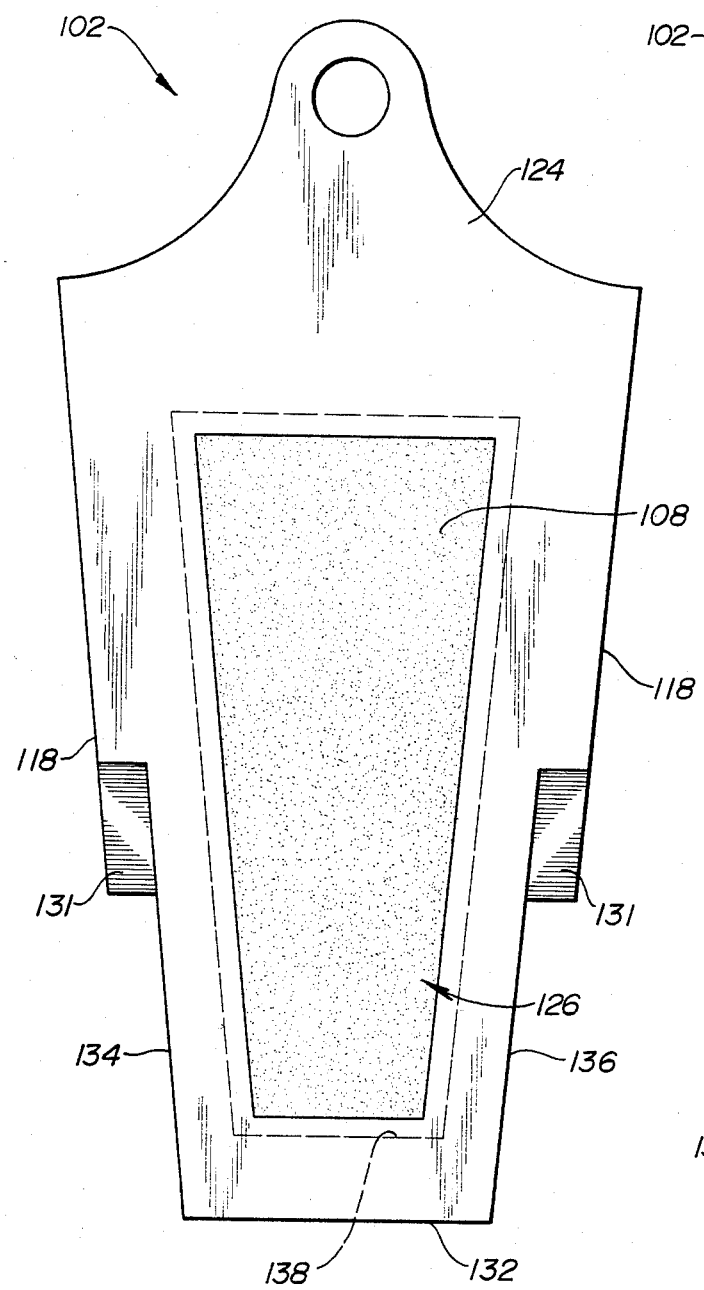
FIG. 3 is a schematic representation of a removable filter blade for use in the transfer crucible shown in FIG. 1. The removable blade contains a filter element. The filter element interrupts the path of molten metal flowing into the transfer crucible and thereby filters the molten metal.

FIG. 3 is a schematic representation of the removable blade 102. The surfaces 122 and 124 are bound by a bottom edge 132, a first side edge 134 and a second side edge 136. Lugs 118 are attached to the first side edge 124 and the second side edge 136 of the blade 102. Support for the filter element 108 can be provided by undercutting the wall 138 of the passage 126 as shown in FIGS. 3 and 4.

Figure 4:
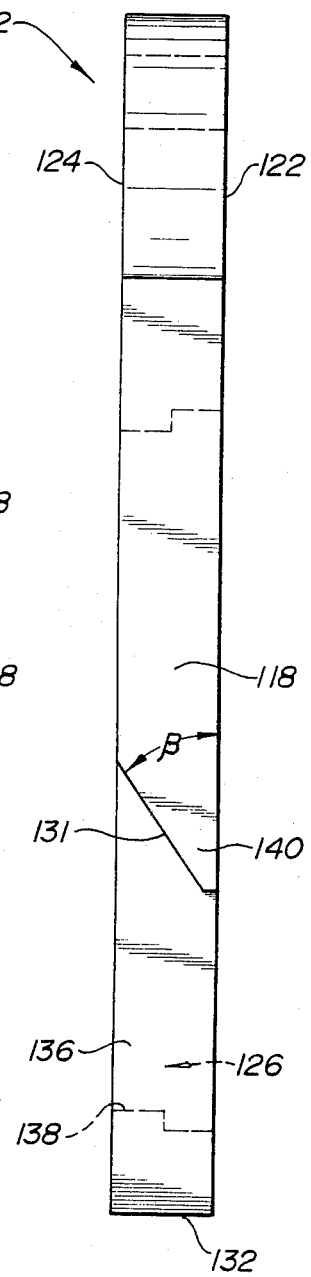
FIG. 4 is a schematic representation of a side view of the removable filter blade shown in FIG. 3.

FIG. 4 is a schematic representation of a side view of the blade 102. The lugs 118 preferably have a first section 140 which makes an angle $\beta$ with respect to the first surface 122. The angle $\beta$ is preferably between 20° and 60°. This angle assures that the blade 102 is properly guided into position when the blade is inserted.

Figure 5:
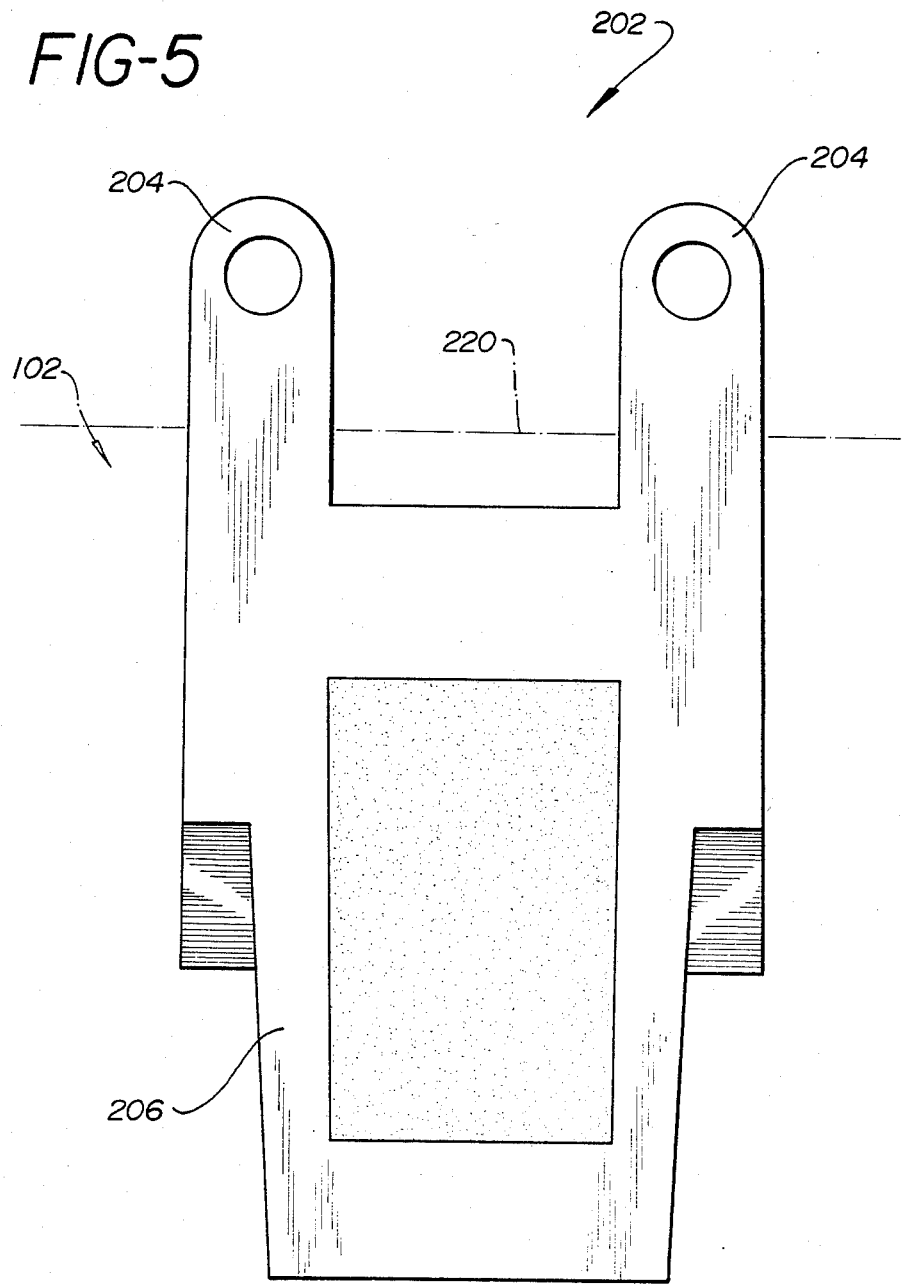
FIG. 5 is a schematic representation of a side view of a second embodiment of a removable filter blade for use in the crucible of the present invention.

FIG. 5 is a schematic representation of a side view of a second embodiment of a blade 202 for use in the transfer crucible of the present invention. The blade 202 is similar in construction to the blade 102 shown in FIG. 4, however, the blade 202 of FIG. 5 is provided with two ears 204 which extend above the level of the molten metal bath 220 to such an extent that the blade body 206 is fully submerged in the molten metal bath 102 during operation. Fully submerging the blade body 206 in the molten metal bath 102 during operation minimizes thermal stresses and the associated warping of the blade body 206.

The molten metal transfer crucible of the present invention is operated as described in U.S. Application 398,406 which has issued as U.S. Pat. No. 4,444,377 which is therein incorporated by reference.

While the novel features of this invention have been described in terms of preferred embodiments and particular applications, it will be appreciated that various omissions and substitutions in form and in detail of the apparatus and method may be made by those skilled in the art without departing from the spirit of the invention.

What we claim:

1. A transfer crucible for containing molten metal, having a cavity, an inlet at a first position, and an outlet at a second position, the improvement comprising:
   a removable blade bound by a first side edge, a second side edge and a bottom edge, having a first surface and a second surface spaced apart with a passage therebetween;
   a filter element positioned in said passage; and
   means for positioning and affixing said blade with respect to said inlet such that said removable blade is external to the crucible cavity and said filter element interrupts the flow of metal through said inlet.

2. The transfer crucible of claim 1 wherein said transfer crucible has a sidewall and said inlet is contained in said sidewall.

3. The transfer crucible of claim 1 wherein said means for positioning and affixing said blade comprise:
   a first lug attached to said blade;
   a second lug attached to to said blade; and
   lug acceptors attached to said crucible.

4. The transfer crucible of claim 3 further comprising a crucible ledge and wherein said lugs have a first region of increasing thickness and said lug acceptors are contoured to direct the blade into contact with said ledge.

5. The transfer crucible of claim 4 wherein the increase in thickness of said first region of said lugs forming a sloped surface forming an angle of between 20° and 60° with respect to said blade.

6. The transfer crucible of claim 4 further comprising an exterior metal chamber located between said crucible cavity and said removable blade.

7. The transfer crucible of claim 6 wherein the cross sectional area of said exterior metal chamber is greater than five times the cross sectional area of the inlet.

8. The transfer crucible of claim 6 wherein said passage in said blade is approximately centered with respect to said first region of said lugs.

9. The transfer crucible of claim 4 further comprising a sealing material between said blade and said crucible ledge wherein said sealing material is a refractory felt.

* * * * *